(12) United States Patent
Donaldson et al.

(10) Patent No.: US 6,371,243 B1
(45) Date of Patent: Apr. 16, 2002

(54) TRUE CRAB STEERING APPARATUS

(75) Inventors: James Donaldson, Puyallup; Nelson Wong, Kirkland, both of WA (US)

(73) Assignee: Genie Industries, Inc., Redmond, WA (US)

( * ) Notice: Subject to any disclaimer, the term of this patent is extended or adjusted under 35 U.S.C. 154(b) by 0 days.

(21) Appl. No.: 09/782,922

(22) Filed: Feb. 13, 2001

(51) Int. Cl.$^7$ .............................. E06C 1/00; E04C 1/00; B62D 5/06

(52) U.S. Cl. ...................... 182/69.4; 182/63.1; 182/141; 180/411

(58) Field of Search ............................... 182/69.4, 63.1, 182/148, 141; 180/411, 414, 415, 326, 327

(56) References Cited

U.S. PATENT DOCUMENTS

| | | | | |
|---|---|---|---|---|
| 3,596,735 A | * | 8/1971 | Denier ...................... 182/63.1 |
| 3,858,688 A | * | 1/1975 | Galloway ................ 182/141 X |
| 4,457,403 A | * | 7/1984 | Ream ..................... 182/141 X |
| 5,533,584 A | * | 7/1996 | Johnson ....................... 180/415 |
| 6,073,067 A | * | 6/2000 | Fujiwara et al. ......... 180/415 X |
| 6,098,823 A | * | 8/2000 | Yahiaoui .................. 182/2.9 X |
| 6,119,882 A | | 9/2000 | Crook et al. |
| 6,164,406 A | * | 12/2000 | Diekhans et al. ....... 180/415 X |
| 6,174,124 B1 | * | 1/2001 | Haverfield et al. ...... 182/148 X |

* cited by examiner

*Primary Examiner*—Daniel P. Stodola
*Assistant Examiner*—Hugh B. Thompson
(74) *Attorney, Agent, or Firm*—Perkins Coie LLP

(57) ABSTRACT

A mobile lift having extendable axes that is capable of switching between front-wheel steer, rear-wheel steer, all-wheel steer, and crab steer without resulting in undesirable tire scrubbing or unfavorable steering geometry. One embodiment provides a mobile personnel lift having a chassis supported by steerable front and rear wheel sets. The steerable wheel sets are mounted on axles that are extendable and retractable. A double-acting hydraulic cylinder is pivotally coupled between each steerable wheel and its corresponding axle for turning the wheel. A microprocessor controls the flow of hydraulic fluid to the hydraulic cylinders. Sensors positioned adjacent to each wheel measure the angular position of each wheel relative to the chassis, and transmit this information to the microprocessor to synchronize the wheels as required to provide the optimum steering geometry for the selected mode.

17 Claims, 2 Drawing Sheets

TRUE CRAB STEERING APPARATUS

TECHNICAL FIELD

The present invention is directed to true crab steering systems, and more particularly, to true crab steering systems for use with mobile personnel lifts.

BACKGROUND

Personnel lifts are useful for providing access to elevated work areas, and they typically include a lift assembly for raising and lowering a platform to a desired position. The position of the platform is usually controlled by an operator located on the platform. Many personnel lifts also include wheel sets that provide mobility between different work locations, the wheel sets being mounted to a chassis that supports the lift assembly. Some of these mobile personnel lifts are self-propelled, and include a drive motor coupled to one or more of the wheel sets to provide the motive force for movement of the personnel lift. On self-propelled personnel lifts such as these, controls on the platform usually enable the operator to steer the personnel lift between different locations using one or more of the wheel sets.

Some self-propelled personnel lifts having front and rear wheel sets can be steered in four different modes: front-wheel steer, rear-wheel steer, all-wheel steer, and crab steer. Front-wheel steering and rear-wheel steering involve coordinated turning of the applicable wheel set while the other wheel set remains fixed and parallel relative to the longitudinal axis of the chassis. All-wheel steering is accomplished by turning the rear wheel set in one direction while turning the front wheel set in the opposite direction to thereby turn the personnel lift in a tighter radius than would otherwise be possible with just front- or rear-wheel steering. Crab steering is accomplished by coordinated turning of both wheel sets so that all four wheels remain parallel to each other. In the crab steer mode, the personnel lift can move translationally in a lateral direction relative to the longitudinal axis of the chassis.

During a turn in front or rear-wheel steer mode, the two turned wheels describe different arcs about the turn center, with the inside wheel closest to the turn center describing a slightly tighter arc than the outside wheel furthest from the turn center. To avoid tire scrubbing when this happens, conventional two-wheel steering systems typically turn the inside wheel at a slightly greater angle relative to the longitudinal axis of the chassis than the outside wheel. Similarly, in all-wheel steer mode, the two inside wheels on the side of the chassis closest to the turn center are typically turned at a slightly greater angle relative to the longitudinal axis of the chassis than the two outside wheels. Thus, in the front, rear, and all-wheel steer modes, corresponding left and right wheels in each turning wheel set should be slightly non-parallel to each other when turned. This is not true in the crab steer mode, however, as all four wheels in both wheel sets should be parallel to each other at all times. Non-parallel wheel relationships in the crab steer mode can result in tire scrubbing and imprecise steering.

Self-propelled personnel lifts having wheel sets mounted on extendable axles are known in the art. The purpose of extendable axles is to narrow the wheel track for transportation, and broaden the wheel track to increase the stability of the personnel lift during operation. A self-propelled boom vehicle having extendable axles is disclosed in U.S. Pat. No. 6,119,882 to Crook, et al. The steering system disclosed in Crook, et al., uses a pair of hydraulic cylinders connected one each to corresponding left and right turning wheels. The hydraulic cylinders are also connected to each other in a closed hydraulic circuit working in a master-slave arrangement. The cylinders operate inversely with respect to each other, so as one steering cylinder moves in one direction, the other cylinder necessarily moves in the opposite direction. Thus corresponding left and right wheels are not turned independently, but instead are coupled together for synchronized turning at all times. As a result, the steering system disclosed by Crook, et al., can not provide the optimum steering geometry in both the crab steer mode and the other modes.

Mobile personnel lifts are often used in close quarters, and thus precise maneuverability of the wheel sets in each of the steer modes is often desirable. One problem with conventional mobile personnel lifts is that their steering systems are often not configured for precise crab steering, or alternatively, their steering systems are a compromise between the crab steer mode and the other steer modes. This is especially true on mobile personnel lifts having extendable axles. This can lead to undesirable tire scrubbing and imprecise steering in one or all of the available steer modes.

SUMMARY

The present invention overcomes limitations of the prior art by providing a mobile lift having extendable axes that is capable of switching between the front-wheel steer, rear-wheel steer, all-wheel steer, and crab steer modes without resulting in undesirable tire scrubbing or unfavorable steering geometry. One embodiment provides a mobile personnel lift having a chassis supported by steerable front and rear wheel sets. A lift assembly is mounted at its proximal end to the chassis, and supports a platform on its other, distal end. The steerable wheel sets of this embodiment are mounted on axles that are extendable and retractable. A double-acting hydraulic cylinder is pivotally coupled between each steerable wheel and its corresponding axle for tuning the wheel. The double-acting hydraulic cylinders are not hydraulically linked, and thus enable corresponding left and right side wheels to be turned independently of each other, eliminating the need for tie rods and allowing optimum steering geometry for each of the four different steering modes (i.e., front-wheel steer, rear-wheel steer, all-wheel steer, and crab steer).

In another embodiment, a directional switch control is provided on the platform that allows an operator to steer the mobile personnel lift. A steering selection box also provided on the platform allows the operator to select between front-wheel steer, rear-wheel steer, all-wheel steer, and crab steer. Both the directional switch and the selector box are coupled to a microprocessor that is in turn operatively coupled to each of the double-acting hydraulic cylinders located at each wheel. The microprocessor controls the flow of hydraulic fluid to the double-acting hydraulic cylinders causing each cylinder to turn its corresponding wheel according to the selected steering mode and the corresponding movement of the joy stick. Sensors positioned adjacent to each wheel and connected to the microprocessor measure the angular position of each wheel relative to the longitudinal axis of the chassis. This information is transmitted to the microprocessor and used to synchronize the steerable wheels as required to provide the optimum steering geometry for the selected mode.

In another embodiment, if front-wheel steer, rear-wheel steer, or all-wheel steer is selected, then corresponding left and right turning wheels will turn at slightly different angles relative to each other to avoid tire scrubbing and provide precise steering geometry in these modes. If crab steering is selected, however, then both front and rear wheel sets will automatically adjust so that they turn at the same angle relative to each other to accordingly avoid tire scrubbing and provide precise steering geometry in this mode. In addition to providing optimum steering geometry, any of the steering modes of this embodiment can be selected "on the fly." That is, they can be selected while the personnel lift is under way and regardless of the amount of axle extension. In one aspect of this embodiment, the speed of the mobile lift is limited according to the turn angle of the wheels to avoid maneuvers that could destabilize the mobile lift. For example, as the turn angle is increased, the allowable speed of the mobile lift is reduced. Conversely, as the turn angle is reduced, the allowable speed of the mobile lift is accordingly increased.

DETAILED DESCRIPTION

In the following description, certain specific details are set forth in order to provide a thorough understanding of various embodiments of the invention. The present disclosure describes true crab steering apparatuses usable with mobile lifts. Many specific details of certain embodiments of the invention are set forth in the following description and in FIGS. 1–2 to provide a thorough understanding of these embodiments. One skilled in the relevant art will understand, however, that the present invention may have additional embodiments, or that the invention may be practiced without several of the details described below. In other instances, well-known structures associated with mobile lifts, such as lift assemblies, hydraulic systems, or microprocessor control systems have not be shown or described in detail to avoid unnecessarily obscuring the description of the embodiments of the invention.

Figure 1:
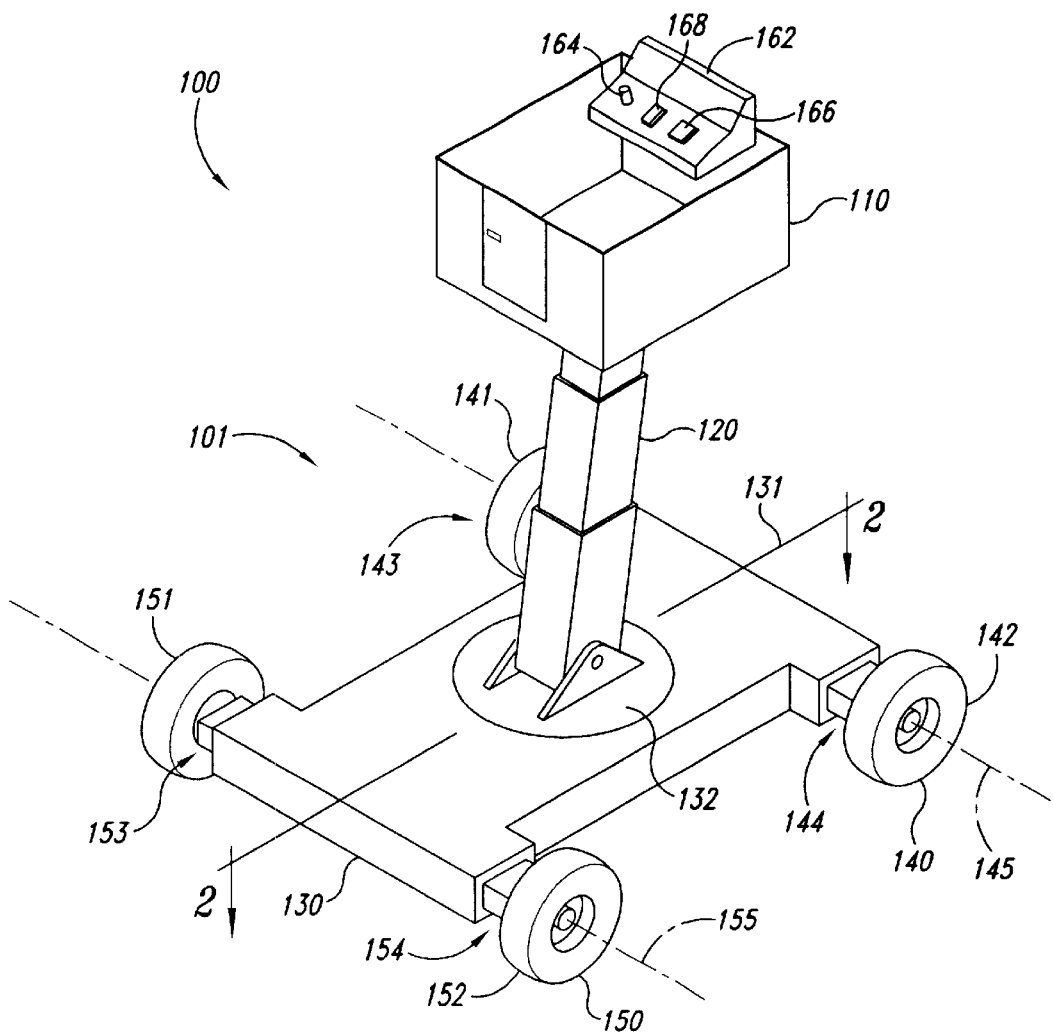
FIG. 1 is an isometric view of a mobile personnel lift having extendable axles and a true crab steering apparatus in accordance with an embodiment of the invention.

FIG. 1 is an isometric view of a mobile lift 100 having a true crab steering apparatus 101 in accordance with an embodiment of the invention. The mobile lift 100 of the illustrated embodiment is a personnel lift having a platform 110 mounted on a distal end of a lift assembly 120. The lift assembly 120 is extendable and retractable along its longitudinal axis to position an operator (not shown) on the platform 110 at a desired elevation. A proximal end of the lift assembly 120 is pivotally coupled to a turntable 132, and the turntable is rotatably mounted to a chassis 130. Pivoting of the lift assembly 120 relative to the turntable 132 moves the platform 110 in a vertical plane relative to the chassis 130, while rotation of the turntable and the lift assembly as a unit moves the platform in a horizontal plane relative to the chassis. Positioning of the platform 110 is accomplished by pivoting the lift assembly 120 horizontally and vertically as required and then extending the lift assembly to the desired elevation. In this manner, the mobile personnel lift 100 can be used to elevate the operator and equipment in the platform 110 to a desired location.

In the illustrated embodiment, the chassis 130 is supported by front and rear wheel sets 140 and 150. The front wheel set 140 includes a steerable left front wheel 141 rotatably coupled to an extendable left front axle 143, and a steerable right front wheel 142 rotatably coupled to an extendable right front axle 144. Similarly, the rear wheel set 150 includes a steerable left rear wheel 151 rotatably coupled to an extendable left rear axle 153, and a steerable right rear wheel 152 rotatably coupled to an extendable right rear axle 154. The steerable front and rear wheels 141, 142, 151 and 152 are independently steerable relative to each other with respect to a longitudinal axis 131 of the chassis 130. As will be discussed in greater detail below, this independence allows the steering geometry to be optimized according to the selected steering mode.

Both front axles 143 and 144 are extendable and retractable along a front axle axis 145, and both rear axles 153 and 154 are similarly extendable and retractable along a rear axle axis 155. Extending the axles can provide added stability during operation of the mobile lift 100 by increasing the wheel track accordingly. Alternatively, retracting the axles to narrow the wheel track can facilitate transportation of the mobile lift 100 over narrow surface streets between job sites.

A control console 162 located on the platform 110 provides controls that enable the operator to control the various movements of the mobile lift 100. In addition to providing controls for positioning the platform 110, the control console 162 also includes an axle extension selector 168 that enables the operator to control the extension of the front and rear extendable axles 143, 144, 153 and 154. The control console 162 also includes a steering selection box 166 and a directional switch 164 for steering the mobile lift 100. In one embodiment, the directional switch 164 can be joystick. In other embodiments, other directional switches, such as rocker switches, can be used. The steering selection box 166 allows the operator to select between front-wheel steer, rear-wheel steer, all-wheel steer and crab steer at any time, even while the mobile lift 100 is underway.

After selecting the desired steering mode on the selection box 166, the operator maneuvers the mobile personnel lift 100 by moving the directional switch 164 in the desired direction. For example, if front-wheel steer is selected, then movement of the directional switch 164 left or right will accordingly cause the two front wheels 141 and 142 to turn in the direction that corresponds to the directional switch position. In one aspect of this embodiment, the wheel closest to the turn center will turn at a slightly greater angle than the other wheel so that turning motion of the mobile lift 100 in this mode will not result in substantial tire scrubbing or imprecise steering. If the directional switch 164 is left in the central position, then the two front wheels 141 and 142 will accordingly remain parallel to the longitudinal axis 131. Movement of the directional switch 164 left or right after rear-wheel steering has been selected on the selection box 166 will accordingly turn the rear wheels 151 and 152 in the same manner as described above in reference to the two front wheels 141 and 142 in the front-wheel steer mode.

If the operator selects the all-wheel steer mode on the selection box 166, then the front and rear wheel sets 140 and 150 will accordingly turn in opposite directions in response to a left or right movement of the directional switch 164. For example, if the directional switch 164 is moved to the left, then the front wheel set 140 will accordingly point to the left of the longitudinal axis 131 while the rear wheel set will accordingly point to the right. As in the front and rear-wheel steer modes described above, corresponding left and right wheels in the all-wheel steer mode will be turned at slightly different angles relative to the longitudinal axis 131 to provide the most efficient steering geometry for this mode.

In accordance with the present invention, if the operator switches to the crab steer mode from either the front-wheel steer, rear-wheel steer, or all-wheel steer mode, then the front and rear wheel sets 140 and 150 will accordingly turn in the same direction in response to left or right movement of the directional switch 164. In this mode, corresponding left and right wheels will be turned at equivalent angles relative to the longitudinal axis 131 to provide true crab steering in the desired direction without tire scrubbing or the imprecise steering that usually accompanies it. Thus, the present invention will automatically adjust the steering to provide the optimum geometry for the selected steering mode. In another aspect of the invention, as the allowable turn angle of the wheels increases, the speed of the mobile lift 100 is reduced to avoid turning maneuvers which could destabilize the mobile lift. As the allowable turn angle is reduced the speed is accordingly increased since the mobile lift 100 is less susceptible to destabilizing maneuvers at lower speeds.

In one embodiment of the invention, to extend or retract the axles 143, 144, 153 or 154, the operator selects the desired axle position for the respective axle on the axle extension selector 168. In one aspect of this embodiment, axle extension and the various steering modes are uncoupled so that the mobile lift 100 can be accurately maneuvered in any of the steering modes regardless of axle position. The operator can even elect to switch steering modes "on the fly" while the axles are being repositioned if desired.

Unlike conventional mobile personnel lifts that offer compromised steering geometry in one or more of the four different modes. The true crab steering apparatus 101 of the present invention offers true crab steering without compromising the other three steering modes. Conventional mobile lifts that have front-wheel steering will typically have the left front wheel coupled to the right front wheel with a tie rod or similar device. If the mobile lift also happens to have rear-wheel steering, then the left rear wheel will typically be coupled to the right rear wheel in a similar fashion. The tie rods ensure that the coupled wheels turn in unison to provide coordinated steering, and they are typically configured to keep the coupled wheels at slightly non-parallel angles when turned to avoid tire scrubbing in the front, rear, or all-wheel steer modes. This conventional tie rod configuration leads to problems, however, if the crab steer mode is selected, as the non-parallel wheel configuration that works well in the other steering modes results in tire scrubbing and imprecise steering in the crab steer mode.

The true crab steering apparatus 101 of the present invention offers the further advantage of providing the optimum steering geometry for the four different modes in addition to providing extendable axle capability. While mobile lifts are known that have four wheel steering and extendable axles, typically these mobile lifts couple the corresponding left and right steering wheels together in a master-slave configuration so that as one turns inward, the other will turn outward in an equivalent amount. Consequently, the turning configuration of the wheels either—parallel or non-parallel—is predetermined and non-adjustable between steering modes. The result is a steering system that is necessarily compromised in one or more of the four possible modes.

Figure 2:
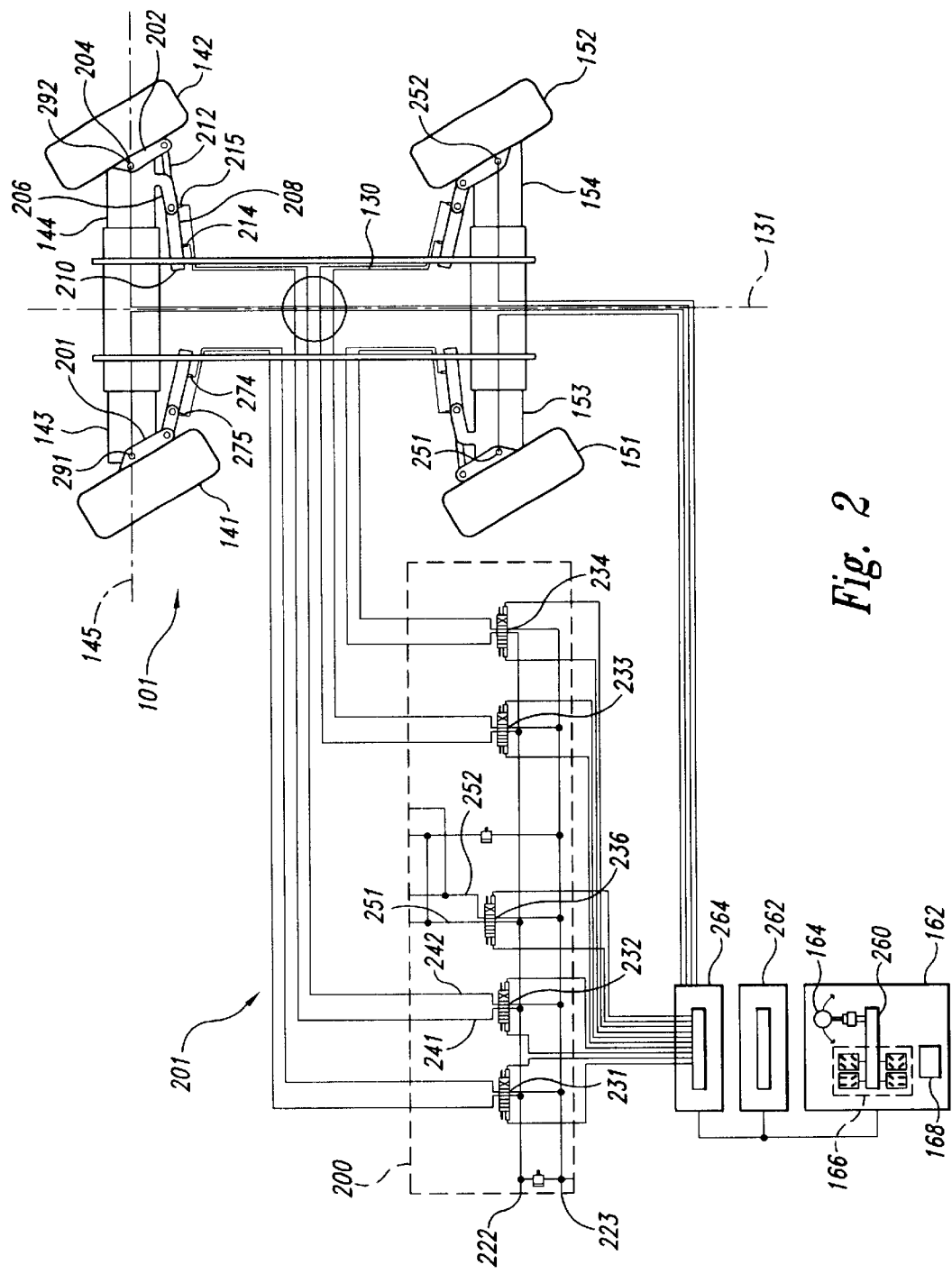
FIG. 2 is schematic top view of the mobile personnel lift of FIG. 1 taken substantially along line 2—2 in FIG. 1.

FIG. 2 is a schematic top view of the mobile lift 100 taken substantially along line 2—2 in FIG. 1, in accordance with an embodiment of the invention. The true crab steering apparatus 101 includes a control system 201 comprising a control console 162 and a hydraulic system 200, which are shown schematically in FIG. 2 for ease of illustration. Although the discussion that follows refers to the steering components of the right front wheel 142, it is equally applicable to the other three wheels on the mobile lift 100 since they use the same elements and function in the same manner.

As can be seen by reference to the right front quadrant of the mobile lift 100, the right front wheel 142 is rotatably coupled to a yoke 202. The yoke 202 is pivotally coupled to the extendable axle 144 by a kingpin 204 located on the front axle axis 145. The kingpin 204 carries the structural loads between the wheel 142 and the extendable axle 144, yet it allows the wheel to turn relative to the longitudinal axis 131 for steering of the mobile lift 100. A bracket 206 is fixedly connected to the extendable axle 144 between the chassis 130 and the yoke 202, and pivotally supports a right front double-acting hydraulic cylinder 208 ("right front cylinder" 208) that is offset from the extendable axle. The right front cylinder 208 has a cylinder body 210 pivotally connected to the bracket 206, and an actuator rod 212 which is slidably disposed in the cylinder body 210. A distal end of the actuator rod 212 is pivotally connected to the yoke 202 at a position offset from the kingpin 204.

A first right port 214 introduces pressurized hydraulic fluid into the cylinder body 210 to extend the actuator rod 212. As the actuator rod 212 is extended, a second right port 215 allows hydraulic fluid to exit the cylinder body 210 accordingly. To retract the actuator rod 212, the roles are reversed and pressurized hydraulic fluid enters the cylinder body 210 through the second right port 215 and exits the first right port 214. Accordingly, the right front wheel 142 can be turned to the right by retraction of the actuator rod 212, and turned to the left by extension of the actuator rod. Mounting the right front cylinder 208 to the extendable axle 144 instead of the chassis 130 allows turning of the right front wheel 142 to be unaffected by the position of the extendable axle. In addition, because the steering systems for corresponding right and left wheels are not coupled, all four wheels of the mobile lift 100 are independently steerable relative to each other.

The hydraulic system 200 provides the pressurized hydraulic fluid that turns the wheels 141, 142, 151 and 152 in response to movement of the directional switch 164 and in accordance with the steer mode selected on the selection box 166. The hydraulic system 200 also provides the pressurized hydraulic fluid for extending and retracting the extendable axles 143, 144, 153 and 154 in response to the axle position selected on the axle extension selector 168. The pressurized hydraulic fluid flows from a pressurized fluid source 222 to the steering and axle extension systems, and returns from these systems to a fluid return 223. The flow of hydraulic fluid to and from the steering system is controlled by four valves 231, 232, 233 and 234, with each valve being operably coupled to one of the cylinders located adjacent to each wheel. In the illustrated embodiment, the four valves 231, 232, 233, and 234 are closed-center 3-position 4-way valves. In other embodiments, other suitable valves can be used.

The valve 232 is operably coupled to the right front cylinder 208 by first and second lines 241 and 242. The center position on the valve 232 is a closed position that prevents any hydraulic fluid from flowing to or from the right front cylinder 208. The left position on the valve 232 allows pressurized hydraulic fluid to flow from the pressurized fluid source 222 through the first line 241 to the first right port 214 on the right front cylinder 208. The left position also simultaneously allows hydraulic fluid to flow from the second right port 215 on the right front cylinder 208 through the second line 242 to the fluid return 223. Conversely, the right position on the valve 232 allows pressurized hydraulic fluid to flow from the pressurized fluid source 222 through the second line 242 and into the second right port 215 on the right front cylinder 208. The right position also simultaneously allows hydraulic fluid to flow from the first right port 214 through the first line 241 to the fluid return 223. Accordingly, moving the valve 232 to the left position will allow pressurized hydraulic fluid to flow into the first right port 214 on the right front cylinder 208 and extend the actuator rod 212, thereby turning the right front wheel 142 to the left. Moving the valve 232 to the right position will allow pressurized hydraulic fluid to enter the second right port 215 on the right front cylinder 208 and retract the actuator rod 212, thereby turning the right front wheel 142 to the right. Although the foregoing discussion has referred to the valve 232 and the steering components for the right front wheel 142 for purposes of illustration, the other three valves 231, 233 and 234 function in the same manner to turn their corresponding wheels 141, 151 and 152.

The hydraulic system 200 also includes a valve 236 for controlling extension and retraction of the extendable axles 143, 144, 153 and 154. In the illustrated embodiment, the valve 236 is a closed-center 3-position 4-way valve. In the left position, the valve 236 allows pressurized hydraulic fluid from the pressurized fluid source 222 to flow through a first axle line 251. The first axle line 251 is bifurcated so that a portion of the pressurized hydraulic fluid goes to extend the two front axles 143 and 144, and the remaining portion of the pressurized hydraulic fluid goes to extend the two rear axles 153 and 154. A second axle line 252 carries the hydraulic fluid returning from the closed front and rear axle extension systems to the fluid return 223. Conversely, in the right position, the valve 236 allows pressurized hydraulic fluid to flow from the pressurized fluid source 222 through the second axle line 252 to retract both front and rear axles, while returning hydraulic fluid is allowed to flow through the first axle line 251 to the fluid return 223. Although, in the illustrated embodiment, both front and rear axles are extended and retracted in unison, it will be apparent to those of skill in the art that in an alternate embodiment additional valves can be incorporated into the present invention so that each of these axles could be extended and retracted independently of the others.

The mobile lift 100 includes a microprocessor 260 that is connected to the directional switch 164, the steering selection box 166, and the extension selector box 168 for receiving the operator's control inputs. The microprocessor 260 is in turn coupled to a main controller 262 and a lower controller 264. In the illustrated embodiment, the main controller 262 and the lower controller 264 comprise microprocessors. The main controller 262 is operably coupled to the lift assembly 120 (FIG. 1) for controlling the position of the platform 110. The main controller 262 is also operably coupled to the valves 231, 232, 233, 234, and 236. When the microprocessor 260 receives the operator's control inputs, it transmits corresponding output signals to the main controller 262. The main controller 262 receives the output signals from the microprocessor 260 and transmits control signals, via the lower controller 264, to the valves 231, 232, 233, 234 and 236. The control signals control the valves as required to steer the mobile lift 100 or extend or retract the axles, in accordance with the operator's control inputs. Methods for constructing microprocessor circuits that work in conjunction with controllers and valves as described herein are known to those of ordinary skill in the art, and as such do not merit further elaboration.

In one embodiment of the present invention, sensors 291 and 292 are positioned adjacent to the left front wheel 141 and the right front wheel 142, respectively, to measure the angular position of the respective wheels. In one aspect of this embodiment, the sensors 291 and 292 are Hall effect variable voltage output analog devices that are mounted, respectively, to the yoke 202 for the right front wheel 142, and to a corresponding yoke 201 for the left front wheel 141. The sensors 291 and 292 are operably coupled to the main controller 262 so that the angular position of the wheels can be monitored at all times and synchronized by the main controller 262 to provide the optimum steering geometry in accordance with the steer mode that the operator has selected.

To steer the mobile lift 100 in accordance with the present invention, the operator selects the desired steer mode on the selection box 166 and then moves the directional switch 164 in the desired direction. For example, if front-wheel steer mode is selected, then movement of the directional switch 164 to the left signals the main controller 262, via the microprocessor 260, to move the valves 231 and 232, via the lower controller 264, to the left position. In the left position, pressurized hydraulic fluid flows into the first right port 214 on the right front cylinder 208 causing the actuator rod 212 to extend accordingly. At the same time, pressurized hydraulic fluid flows into a first left port 275 on a left front cylinder 278, causing an actuator rod 282 to retract accordingly. As a result, in front-wheel steer mode both left and right wheels 141 and 142 will turn to the left in response to the operator moving the directional switch 164 to the left. Concurrently, the sensors 291 and 292 will measure the turn angles of their corresponding wheels and transmit this information to the main controller 262 so that the main controller can adjust the turn angles as required to provide the optimum steering geometry for the selected steer mode.

In accordance with the present invention, in the front-wheel steer mode as selected here, the left front wheel 141 will be turned at a slightly greater angle relative to the longitudinal axis 131 than the right front wheel 142, to avoid tire scrubbing and provide optimum steering geometry as explained above. If the operator alternatively selects the rear-wheel steer or all-wheel steer mode on the selection box 166, then sensors 251 and 252 adjacent to the rear axles 153 and 154, and the sensors 291 and 292 adjacent to the front axles 143 and 144, will similarly ensure that corresponding left and right turning wheels will turn as described above for the front-wheel steer mode. That is, the sensors will ensure that the inner wheel closest to the turn center is turned at a slightly greater angle relative to the longitudinal axis 131 than the corresponding outer wheel.

If the operator selects the crab steer mode on the selection box 166, then movement of the directional switch 164 to the left signals the main controller 262, via the microprocessor 260, to move all the steering valves 231, 232, 233, and 234, via the lower controller 264, to the left position. As a result, in crab steer mode, both left and right front wheels 141 and 142, and both left and right rear wheels 151 and 152, will turn to the left in response to the operator moving the directional switch 164 to the left. Concurrently, the sensors 291, 292, 251, and 252 will measure the turn angles of their corresponding wheels and transmit this information to the main controller 262, via the lower controller 264, so that the main controller can adjust the turn angles as required to provide the optimum steering geometry. In the crab steer mode, the present invention provides the optimum steering geometry by turning the left and right front wheels 141 and 142, and the left and right rear wheels 151 and 152, at equivalent angles relative to the longitudinal axis 131 so as to remain parallel to each other and provide true crab steering geometry.

Although specific embodiments of, and examples for, the present invention are described herein for illustrative purposes, various equivalent modifications can be made without departing from the spirit and the scope of the invention, as will be recognized by those skilled in the relevant art. The teachings provided herein of the present invention can be applied to other steerable vehicles, not necessarily the exemplary mobile lift generally described above.

These and other changes can be made to the invention in light of the above-detailed description. In general, in the following claims, the terms used should not be construed to limit the invention to the specific embodiments disclosed in the specification and the claims, but should be construed to include all mobile lift steering systems that operate in accordance with the claims to provide the true crab steering apparatus and methods for its use of the present invention. Accordingly, the invention is not limited by the disclosure, but instead its scope is to be determined entirely by the following claims.

We claim:

1. A mobile lift having a true crab steering apparatus, the mobile lift comprising:

a lift assembly;

a chassis having a longitudinal axis and a left front portion, a right front portion, a left rear portion, and a right rear portion, the lift assembly being mounted to the chassis;

a left front axle extensibly mounted to the left front portion of the chassis and being moveable relative to the chassis between extended and retracted positions;

a right front axle extensibly mounted to the right front portion of the chassis in axial alignment with the left front axle and being moveable relative to the chassis between extended and retracted positions;

a left rear axle extensibly mounted to the left rear portion of the chassis and being moveable relative to the chassis between extended and retracted positions;

a right rear axle extensibly mounted to the right rear portion of the chassis in axial alignment with the left rear axle and being moveable relative to the chassis between extended and retracted positions;

a front wheel set having a left front wheel and a right front wheel, the left front wheel being rotatably mounted to the left front axle, the right front wheel being rotatably mounted to the right front axle, the left and right front wheels being turnable relative to the longitudinal axis of the chassis;

a rear wheel set having a left rear wheel and a right rear wheel, the left rear wheel being rotatably mounted to the left rear axle, the right rear wheel being rotatably mounted to the right rear axle, the left and right rear wheels being turnable relative to the longitudinal axis of the chassis;

a left front actuator operably coupled between the left front wheel and the left front axle, the left front actuator being extendable and retractable relative to the chasis causing the left front wheel to turn relative to the longitudinal axis of the chassis;

a right front actuator operably coupled between the right front wheel and the right front axle, the right front actuator being extendable and retractable relative to the chasis causing the right front wheel to turn relative to the longitudinal axis of the chassis, the right front actuator being operably independent from the left front actuator;

a left rear actuator operably coupled between the left rear wheel and the left rear axle, the left rear actuator being extendable and retractable relative to the chasis causing the left rear wheel to turn relative to the longitudinal axis of the chassis;

a right rear actuator operably coupled between the right rear wheel and the right rear axle, the right rear actuator being extendable and retractable relative to the chasis causing the right rear wheel to turn relative to the longitudinal axis of the chassis, the right rear actuator being operably independent from the left rear actuator; and a control system operably connected to the left and right front actuators and the left and right rear actuators, wherein the control system is adjustable between a front-wheel steer mode, a rear-wheel steer mode, an all-wheel steer mode, and a crab steer mode, in the front-wheel steer mode and the all-wheel steer mode, the left and right front wheels are non-parallel to each other when the front wheel set is turned relative to the longitudinal axis of the chassis, in the rear-wheel steer mode and the all-wheel steer mode, the left and right rear wheels are non-parallel to each other when the rear wheel set is turned relative to the longitudinal axis of the chassis, and in the crab steer mode, the left and right front wheels, and the left and right rear wheels, are at least substantially parallel to each other when the front and rear wheel sets are turned relative to the longitudinal axis of the chassis.

2. The mobile lift of claim 1 wherein:

the left and right front actuators are mounted exterior of the left and right front axles, respectively; and the left and right rear actuators are mounted exterior of the left and right rear axles, respectively.

3. The mobile lift of claim 1 wherein the control system comprises:

a microprocessor operably connected to the left and right front actuators and the left and right rear actuators;

a directional switch operably connected to the microprocessor, the directional switch being movable between a full left position and a full right position; and a steering mode selection box operably connected to the microprocessor and adjustable to select between the front-wheel steer mode, the rear-wheel steer mode, the all-wheel steer mode, and the crab steer mode, in the front-wheel steer mode the microprocessor causes the left and right front wheels to turn non-parallel to each other in response to movement of the directional switch to the full left or full right positions, in the rear-wheel steer mode the microprocessor causes the left and right rear wheels to turn non-parallel to each other in response to movement of the directional switch to the full left or full right positions, in the all-wheel steer mode the microprocessor causes the left and right front wheels to turn in a first direction non-parallel to each other, and causes the left and right rear wheels to turn in a second direction opposite the first direction non-parallel to each other in response to movement of the directional switch to the full left or full right positions, and in the crab steer mode the microprocessor causes the left and right front wheels, and the left and right rear wheels, to turn in the same direction at least substantially parallel to each other in response to movement of the directional switch to the full left or full right positions.

4. The mobile lift of claim 1 further comprising:

a left front sensor positioned adjacent to the left front wheel, the left front sensor being operably connected to the control system and configured to measure a turn angle of the left front wheel relative to the longitudinal axis of the chassis; and a right front sensor operably independent of the left front sensor and positioned adjacent to the right front wheel, the right front sensor being operably connected to the control system and configured to measure a turn angle of the right front wheel relative to the longitudinal axis of the chassis.

5. The mobile lift of claim 1 wherein the left and right front actuators and the left and right rear actuators are double-acting hydraulic cylinders.

6. The mobile lift of claim 1 wherein the left and right front actuators and the left and right rear actuators are double-acting hydraulic cylinders configured to receive and return a flow of hydraulic fluid, the mobile lift further comprising:

a first valve operably connected to the control system for controlling the flow of hydraulic fluid to the left front actuator;

a second valve operably connected to the control system for controlling the flow of hydraulic fluid to the right front actuator;

a third valve operably connected to the control system for controlling the flow of hydraulic fluid to the left rear actuator; and a fourth valve operably connected to the control system for controlling the flow of hydraulic fluid to the right rear actuator.

7. The mobile lift of claim 6 wherein the first, second, third, and fourth valves are closed-center three-position four-way valves.

8. A mobile lift having a true crab steering apparatus, the true crab steering apparatus being useable for steering the mobile lift in a first steer mode wherein corresponding left and right wheels are turned non-parallel to each other, and useable for steering the mobile lift in a second steer mode wherein corresponding left and right wheels are turned at least substantially parallel to each other, the mobile lift comprising:

a lift assembly;

a chassis having a longitudinal axis and a left front portion, a right front portion, a left rear portion, and a right rear portion, the lift assembly being mounted to the chassis;

a left front axle extensibly mounted to the left front portion of the chassis and being moveable relative to the chassis between extended and retracted positions;

a right front axle extensibly mounted to the right front portion of the chassis in axial alignment with the left front axle and being moveable relative to the chassis between extended and retracted positions;

a left rear axle extensibly mounted to the left rear portion of the chassis and being moveable relative to the chassis between extended and retracted positions;

a right rear axle extensibly mounted to the right rear portion of the chassis in axial alignment with the left rear axle and being moveable relative to the chassis between extended and retracted positions;

a front wheel set having a left front wheel and a right front wheel, the left front wheel being rotatably mounted to the left front axle, the right front wheel being rotatably mounted to the right front axle, the left and right front wheels being turnable relative to the longitudinal axis of the chassis;

a rear wheel set having a left rear wheel and a right rear wheel, the left rear wheel being rotatably mounted to the left rear axle, the right rear wheel being rotatably mounted to the right rear axle, the left and right rear wheels being turnable relative to the longitudinal axis of the chassis;

a left front actuator operably coupled between the left front wheel and the left front axle exterior of the left front axle, the left front actuator being extendable and retractable relative to the chasis causing the left front wheel to turn relative to the longitudinal axis of the chassis;

a right front actuator operably coupled between the right front wheel and the right front axle exterior of the right front axle, the right front actuator being extendable and retractable relative to the chasis causing the right front wheel to turn relative to the longitudinal axis of the chassis;

a left rear actuator operably coupled between the left rear wheel and the left rear axle exterior of the left rear axle, the left rear actuator being extendable and retractable relative to the chasis causing the left rear wheel to turn relative to the longitudinal axis of the chassis; and a right rear actuator operably coupled between the right rear wheel and the right rear axle exterior of the right rear axle, the right rear actuator being extendable and retractable relative to the chasis causing the right rear wheel to turn relative to the longitudinal axis of the chassis.

9. The mobile lift of claim 8 wherein:

the right front actuator is operably independent from the left front actuator; and the right rear actuator is operably independent from the left rear actuator.

10. The mobile lift of claim 8 wherein:

extension of the left front actuator causes the left front wheel to turn in a first direction relative to the longitudinal axis of the chassis, and retraction of the left front actuator causes the left front wheel to turn in a second direction relative to the longitudinal axis of the chassis;

extension of the right front actuator causes the right front wheel to turn in the second direction relative to the longitudinal axis of the chassis, and retraction of the right front actuator causes the right front wheel to turn in the first direction relative to the longitudinal axis of the chassis;

extension of the left rear actuator causes the left rear wheel to turn in the second direction relative to the longitudinal axis of the chassis, and retraction of the left rear actuator causes the left rear wheel to turn in the first direction relative to the longitudinal axis of the chassis; and extension of the right rear actuator causes the right rear wheel to turn in the first direction relative to the longitudinal axis of the chassis, and retraction of the right rear actuator causes the right rear wheel to turn in the second direction relative to the longitudinal axis of the chassis.

11. The mobile lift of claim 8 further comprising a microprocessor operably connected to the left front actuator and the right front actuator, the microprocessor being configured to cause the left and right front actuators to turn the left and right front wheels, respectively, non-parallel to each other when the front and rear wheels are turned in opposite directions relative to the longitudinal axis of the chassis.

12. The mobile lift of claim 8 further comprising a microprocessor operably connected to the left front actuator and the right front actuator, the microprocessor being configured to cause the left and right front actuators to turn the left and right front wheels, respectively, non-parallel to each other when the front wheels are turned relative to the longitudinal axis of the chassis and the rear wheels remain substantially parallel to the longitudinal axis of the chassis.

13. The mobile lift of claim 8 further comprising a microprocessor operably connected to the left front actuator and the right front actuator, the microprocessor being configured to cause the left and right front actuators to turn the left and right front wheels, respectively, at least substantially parallel to each other when the front and rear wheels are turned in the same direction relative to the longitudinal axis of the chassis.

14. The mobile lift of claim 8 further comprising:
- a microprocessor operably connected to the left and right front actuators and the left and right rear actuators;
- a directional switch operably connected to the microprocessor, the directional switch being movable to a full left position and to a full right position; and
- a steering mode selection box operably connected to the microprocessor and adjustable to select between a front-wheel steer mode and a crab steer mode, selection of the front-wheel steer mode causing the microprocessor to turn the left and right front wheels non-parallel to each other in response to movement of the directional switch to the full left or full right positions, selection of the crab steer mode causing the microprocessor to turn the left and right front wheels at least substantially parallel to each other in response to movement of the joystick to the full left or full right positions.

15. A mobile lift having a true crab steering apparatus, the mobile lift comprising:
- a lift assembly;
- a chassis having a left portion and a right portion and a longitudinal axis, the lift assembly being mounted to the chassis;
- a first left axle extensibly mounted to the left portion of the chassis and being moveable relative to the chassis between extended and retracted positions;
- a first right axle extensibly mounted to the right portion of the chassis in axial alignment with the first left axle and being moveable relative to the chassis between extended and retracted positions;
- a second left axle mounted to the left portion of the chassis;
- a second right axle mounted to the right portion of the chassis in axial alignment with the second left axle;
- a first wheel set having a first left wheel and a first right wheel, the first left wheel being rotatably mounted to the first left axle, the first right wheel being rotatably mounted to the first right axle, the first left and right wheels being turnable relative to the longitudinal axis of the chassis;
- a second wheel set having a second left wheel and a second right wheel, the second left wheel being rotatably mounted to the second left axle, the second right wheel being rotatably mounted to the second right axle, the second left and right wheels being turnable relative to the longitudinal axis of the chassis;
- a first left actuator operably coupled between the first left wheel and the first left axle, the first left actuator being extendable and retractable relative to the chasis causing the first left wheel to turn relative to the longitudinal axis of the chassis;
- a first right actuator operably coupled between the first right wheel and the first right axle, the first right actuator being extendable and retractable relative to the chasis causing the first right wheel to turn relative to the longitudinal axis of the chassis, the first right actuator being operably independent from the first left actuator;
- a second left actuator operably coupled between the second left wheel and the second left axle, the second left actuator being extendable and retractable relative to the chasis causing the second left wheel to turn relative to the longitudinal axis of the chassis;
- a second right actuator operably coupled between the second right wheel and the second right axle, the second right actuator being extendable and retractable relative to the chasis causing the second right wheel to turn relative to the longitudinal axis of the chassis, the second right actuator being operably independent from the second left actuator; and
- a control system operably connected to the first left and right actuators and the second left and right actuators, wherein the control system is adjustable between a two-wheel steer mode, an all-wheel steer mode, and a crab steer mode, in the two-wheel steer mode and the all-wheel steer mode, the first left and right wheels are non-parallel to each other when the first wheel set is turned relative to the longitudinal axis of the chassis, and in the crab steer mode, the first left and right wheels, and the second left and right wheels, are at least substantially parallel to each other when the first and second wheel sets are turned in the same direction relative to the longitudinal axis of the chassis.

16. The mobile lift of claim 15 further comprising:
- a left sensor operably connected to the control system and positioned adjacent to the first left wheel, the left sensor being configured to measure a turn angle of the first left wheel relative to the longitudinal axis of the chassis; and
- a right sensor operably connected to the control system and positioned adjacent to the first right wheel, the right sensor being configured to measure a turn angle of the first right wheel relative to the longitudinal axis of the chassis.

17. The mobile lift of claim 15 wherein:
- the second left axle is extensibly mounted to the left portion of the chassis and moveable relative to the chassis between extended and retracted positions; and
- the second right axle is extensibly mounted to the right portion of the chassis in axial alignment with the second left axle and moveable between extended and retracted positions.

* * * * *

UNITED STATES PATENT AND TRADEMARK OFFICE
CERTIFICATE OF CORRECTION

PATENT NO. : 6,371,243 B1
DATED : April 16, 2002
INVENTOR(S) : Donaldson et al.

It is certified that error appears in the above-identified patent and that said Letters Patent is hereby corrected as shown below:

Column 2,
Line 37, "tuning" should be -- turning --;

Column 5,
Line 53, "either—parallel or non-parallel—" should be -- -- either parallel or non-parallel -- --;

Signed and Sealed this

Eighteenth Day of June, 2002

Attest:

Attesting Officer

JAMES E. ROGAN
Director of the United States Patent and Trademark Office